(12) United States Patent  
Swift et al.

(10) Patent No.: US 7,052,763 B2  
(45) Date of Patent: May 30, 2006

(54) MULTI-ELEMENT CONNECTOR

(75) Inventors: Joseph A. Swift, Ontario, NY (US); Stanley J. Wallace, Victor, NY (US)

(73) Assignee: Xerox Corporation, Stamford, CT (US)

( * ) Notice: Subject to any disclaimer, the term of this patent is extended or adjusted under 35 U.S.C. 154(b) by 374 days.

(21) Appl. No.: 10/634,708

(22) Filed: Aug. 5, 2003

(65) Prior Publication Data

US 2005/0029009 A1    Feb. 10, 2005

(51) Int. Cl.
*D04H 1/04* (2006.01)

(52) U.S. Cl. ............... 428/300.4; 428/293.1; 428/293.7; 428/294.1; 428/294.4; 428/295.4; 428/296.7; 428/298.1; 428/298.7; 428/297.7; 428/299.1; 428/300.1; 428/209

(58) Field of Classification Search .......... 428/408, 428/295.1, 296.7, 297.7, 298.1, 299.1, 300.4, 428/293.1, 293.7, 294.1, 294.4, 295.4, 298.7, 428/300.1
See application file for complete search history.

(56) References Cited

U.S. PATENT DOCUMENTS

| | | | |
|---|---|---|---|
| 4,330,349 A | 5/1982 | Swift et al. | 156/72 |
| 4,841,099 A | 6/1989 | Epstein et al. | 174/68.5 |
| 4,868,038 A * | 9/1989 | McCullough et al. | 428/222 |
| 4,970,553 A | 11/1990 | Orlowski et al. | 355/200 |
| 5,139,862 A | 8/1992 | Swift et al. | 428/294 |
| 5,167,512 A | 12/1992 | Walkup | 439/66 |
| 5,220,481 A | 6/1993 | Swift et al. | 361/225 |
| 5,250,756 A | 10/1993 | Swift et al. | 174/119 R |
| 5,267,866 A | 12/1993 | Swift et al. | 439/31 |
| 5,270,106 A | 12/1993 | Orlowski et al. | 428/295 |
| 5,281,771 A | 1/1994 | Swift et al. | 174/262 |
| 5,354,607 A | 10/1994 | Swift et al. | 428/294 |
| 5,366,773 A | 11/1994 | Schroll et al. | 428/36.9 |
| 5,410,386 A | 4/1995 | Swift et al. | 355/200 |
| 5,414,216 A | 5/1995 | Swift et al. | 174/124 R |
| 5,420,465 A | 5/1995 | Wallace et al. | 307/116 |
| 5,492,743 A | 2/1996 | Schroll et al. | 428/36.9 |
| 5,599,615 A | 2/1997 | Swift et al. | 428/293.1 |
| 5,689,791 A | 11/1997 | Swift | 399/353 |
| 5,744,090 A | 4/1998 | Jones et al. | 264/427 |
| 5,756,998 A | 5/1998 | Marks et al. | 250/324 |
| 5,794,100 A | 8/1998 | Bell et al. | 399/90 |
| 5,812,908 A | 9/1998 | Larocca et al. | 399/90 |
| 5,843,567 A | 12/1998 | Swift et al. | 428/221 |
| 5,929,516 A | 7/1999 | Heerman et al. | 257/701 |
| 6,122,172 A | 9/2000 | Dumoulin et al. | 361/719 |
| 6,130,478 A | 10/2000 | Dumoulin et al. | 257/728 |
| 6,214,921 B1 | 4/2001 | Bluett et al. | 524/495 |
| 6,217,341 B1 | 4/2001 | Glick et al. | 439/66 |
| 6,221,229 B1 | 4/2001 | Heerman et al. | 205/125 |
| 6,249,048 B1 | 6/2001 | Heerman et al. | 257/701 |
| 6,265,046 B1 | 7/2001 | Swift | 428/88 |

(Continued)

OTHER PUBLICATIONS

Polygon, 2003 (1 page).

(Continued)

*Primary Examiner*—Cathy F. Lam
(74) *Attorney, Agent, or Firm*—Andrew D. Ryan

(57) ABSTRACT

An apparatus such as a connector or circuit includes a substrate having a plurality of conductive members and a plurality of non-conductive members. The conductive members include a plurality of conductive fibers in association with a polymer material. The conductive members and the non-conductive members are disposed in the substrate member and are selectively situated with respect to each other forming a modular matrix configuration of contacts suitable for an array or association with other circuitry.

36 Claims, 9 Drawing Sheets

U.S. PATENT DOCUMENTS 6,289,187 B1    9/2001   Swift et al. .................... 399/90
6,330,542 B1   12/2001   Sevcik et al. ................... 705/8
6,444,102 B1    9/2002   Tucci et al. ................... 204/279
6,689,835 B1 *  2/2004   Amarasekera et al. ...... 524/495

OTHER PUBLICATIONS

Fujipoly America Corp—Zebra Elastomeric Connectors (3 pages).

* cited by examiner

MULTI-ELEMENT CONNECTOR

The invention relates to connectors, interconnects, circuits, and test systems suitable for use in the electronic packaging industry and in electrical systems.

Reference is made to copending application, Ser. No. 10/634,983, entitled, RF Connector, filed concurrently herewith, and the disclosure of which is totally incorporated herein by reference.

Semiconductor manufacturers employ functional testing of electronic devices to determine lot yields for meeting performance thresholds. Various production parameters are used to establish control of the manufacturing procedures and assure the highest level of quality possible. Where very high density circuitry is produced. Very Large Scale Integrated (VLSI) chips for example, it may be necessary to perform additional testing on packaged chips to assure long term reliability. Generally, elevated temperature is used to accelerate failure mechanisms and it is important that the veracity of the functional and high temperature (sometimes called "burn in") testing is as high as possible. Unfortunately using temperature as the acceleration factor also often induces failures in the apparatus required to provide the test-bed for the burn in testing. This process can lead to incompletely tested devices that are passed on to the customer resulting in customer site failures. This scenario is exacerbated for highly complex integrated circuit devices having tens to hundreds of output interconnections per chip.

Existing test technology including "Ball Grid Array" (BGA) contacts and torsion wire and compressive springwire contacts, and the like are often made from either stamped metal or solder balls and are often unreliable and cause short socket life and excessive cost to the electronics industry. Contamination, corrosion, or erosion of the contact surface can lead to high contact resistances and faulty test diagnoses.

Printed Wiring Board (PWB) assemblies are used in electrical test systems. Moreover, some contacts, interconnects, and connectors used in high frequency/high bandwidth applications and related circuits as high as 1 Ghz and above are known to have failure modes relating to poor electric contact between mating pairs of metal contacts which may lead to unreliable circuit performance and emission of RF energy to the environment which may affect nearby electric and communications equipment. Thus, there is a need for improved materials and systems for improved reliability of connector and RF devices. In addition, there is a need for improved contact reliability, improved test systems, and improved operational life of the burn-in sockets for additional productivity in the electronics packaging industry and electrical systems.

It is generally known within the extrusion and pultrusion industries that fibers can be pultruded with resin to form a configuration consisting of multiple fibers comprising reinforcing material bound by resin. By example, thin, nonwoven sheets of random oriented carbon fiber which are referred to as veils are used as protective surface layers on pultruded I-beams, rails, boards, and structural members to improve surface abrasion characteristics of the member. The veil layer in these structures also imparts an irregular surface texture to the surface, which is absent in general, continuous fiber reinforced pultrusion. High modulus materials within extruded shapes may be formed by inserting carbon fiber materials where needed to provide high strength within the profile geometry. A fiber structure that is tubular in cross-section consisting of carbon fibers surrounded by a combination of fiberglass and resin is generally known.

Reference is made to pultrusion, contacts, and connectors in U.S. Pat. Nos. 4,330,349; 4,841,099; 4,970,553; 5,139,862; 5,167,512; 5,220,481; 5,250,756; 5,267,866; 5,270,106; 5,281,771; 5,354,607; 5,366,773; 5,410,386; 5,414,216; 5,420,465; 5,492,743; 5,599,615; 5,689,791; 5,744,090; 5,756,998; 5,794,100; 5,812,908; 5,843,567; 6,214,921; 6,217,341; 6,265,046; and 6,289,187.

All documents cited herein, including the foregoing, are incorporated herein by reference in their entireties for all purposes.

In embodiments, provided is an apparatus including a substrate member having a length, a width, a thickness, and a surface area. The substrate member includes a polymer, a plurality of conductive members and a plurality of non-conductive members. Each of the conductive members and the non-conductive members have a length and an imaginary axis. The plurality of conductive members comprises a plurality of conductive fibers and a polymer material. The plurality of conductive fibers are configured in a relation to each other and in association with the polymer material. The plurality of conductive members and the plurality of non-conductive members are disposed in the substrate member and are selectively situated with respect to each other and form a matrix configuration including at least one selected dimension between the imaginary axis of the plurality of conductive members and including at least one selected dimension between the imaginary axis of the plurality of non-conductive members. The polymer of the substrate member is solidified about at least a portion of a periphery of the plurality of conductive members and is solidified about at least a portion of a periphery of the plurality of non-conductive members forming an integral structure. At least one conductive member includes an exposed surface for contact.

In another embodiment, provided is an apparatus including a substrate member comprising a length, a width, a thickness, a polymer, a plurality of conductive pultruded composite members, and a plurality of non-conductive members. The plurality of conductive pultruded composite members include a plurality of conductive carbon fibers and a polymer material. The plurality of conductive carbon fibers are configured in a relation to each other and in association with the polymer material. Each conductive pultruded composite member has a first end and a second end. The plurality of non-conductive members include a plurality of non-conductive fibers. Each non-conductive member has a first end and a second end. The plurality of conductive pultruded composite members and the plurality of non-conductive members are disposed in the substrate member and are selectively situated with respect to each other and form a matrix configuration including at least one selected dimension between the imaginary axis of a plurality of conductive pultruded composite members and including at least one selected dimension between the imaginary axis of a plurality of non-conductive members. The polymer of the substrate member is solidified about at least a portion of a periphery of the plurality of conductive pultruded composite members and is solidified about at least a portion of a periphery of the plurality of non-conductive members forming an integral structure. At least one conductive pultruded composite member is accessible at the first end and the second end for contact.

In a further embodiment, provided is an apparatus including a substrate member including a length, a width, a thickness, a polymer, and a plurality of conductive members. The plurality of conductive members having a first end, a second end, and a length. The plurality of conductive members include a plurality of conductive fibers extending in the substrate member. At least one continuity break defining an interruption along the length of at least one conductive member is between the first end and the second end of the at least one conductive member. At least one conductive contact area is associated with at least one conductive member on one side of the at least one continuity break. At least one conductive contact area is associated with at least one conductive member on the other side of the at least one continuity break. The plurality of conductive members are disposed in the substrate member and are selectively situated with respect to each other and form a matrix configuration including at least one selected dimension between the imaginary axis of a plurality of conductive members; wherein the polymer of the substrate member is solidified about at least a portion of a periphery of the plurality of conductive members forming an integral structure.

Accordingly, the figures and description are to be regarded as illustrative in nature, and not as restrictive or limiting.

FIGS. 1a, 1b, and 1c depict top views of embodiments of a connector having an array of conductive and non-conductive regions.

Figure 6:
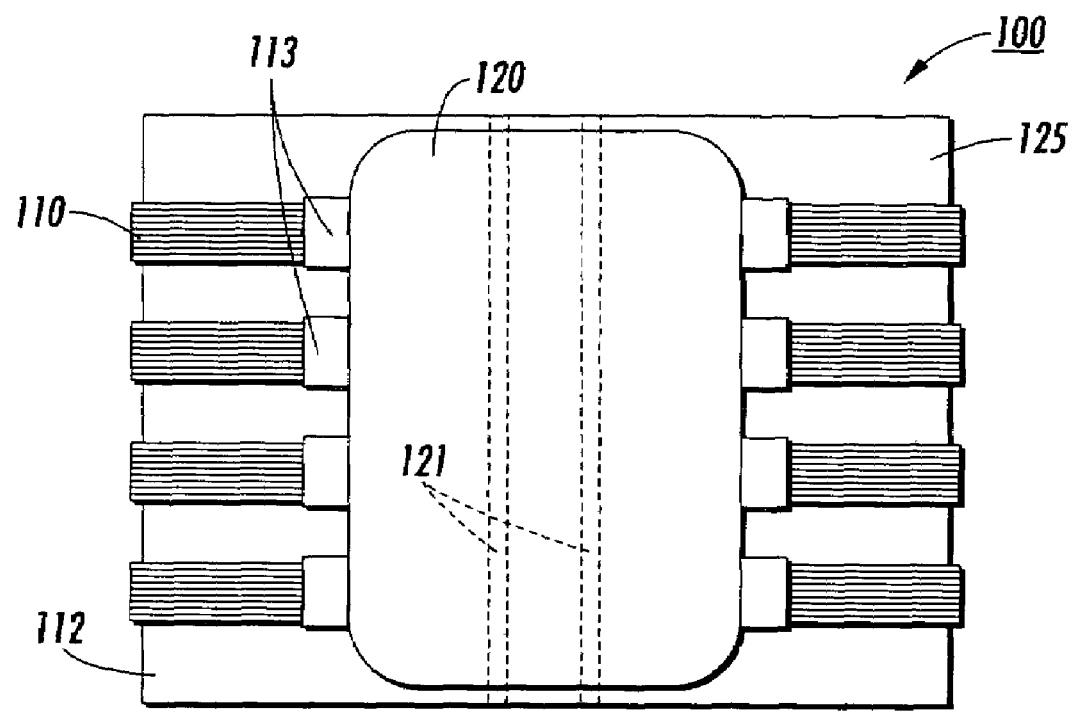
Figure 6A:
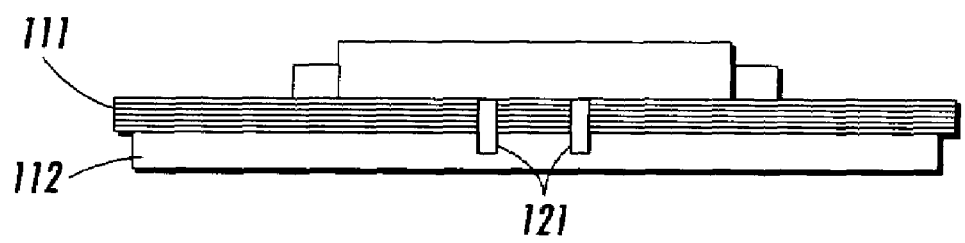
Figure 6B:
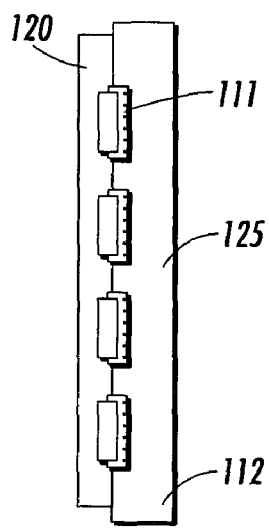
Figure 7:
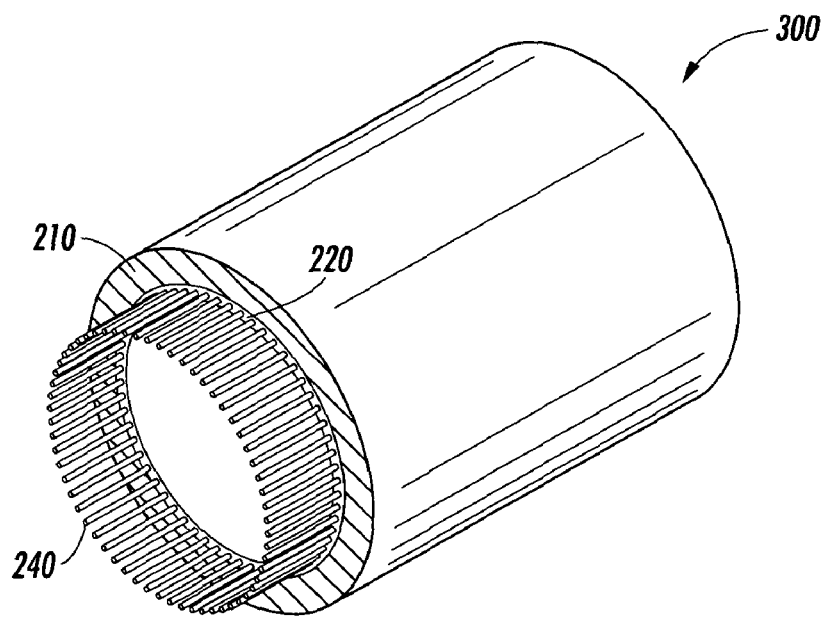
Figure 8:
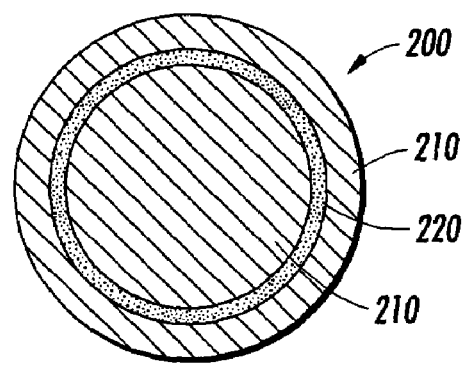
Figure 9:
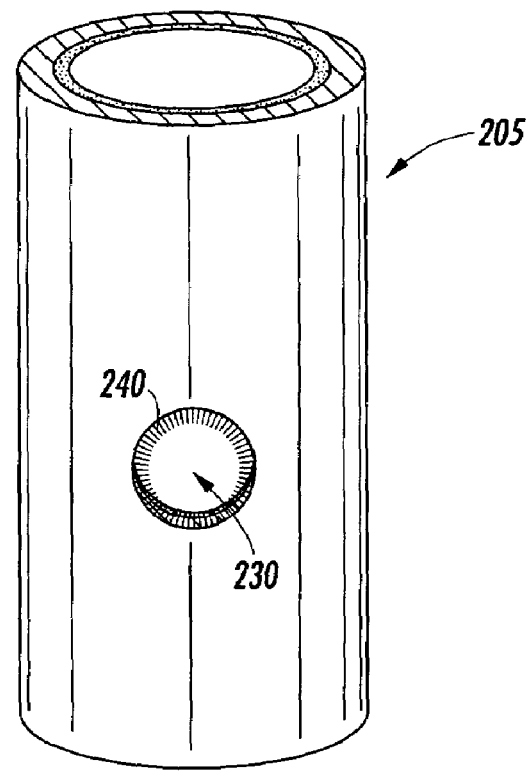
Figure 10:
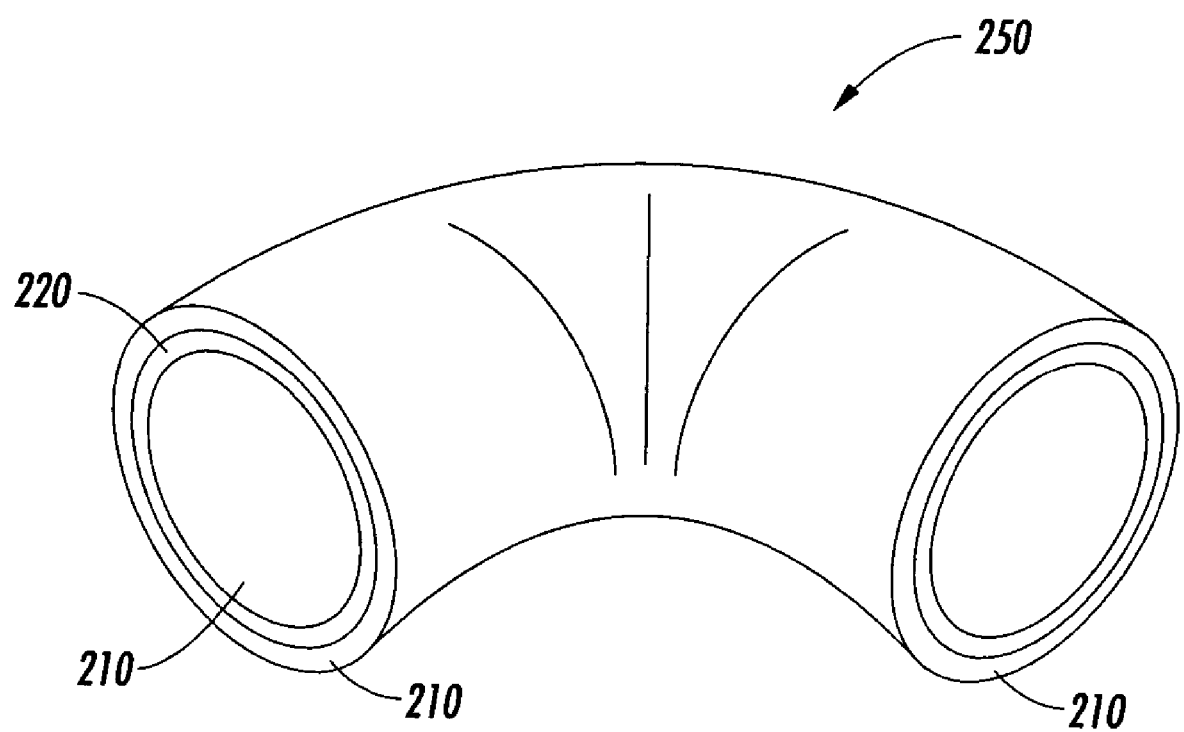

FIGS. 6, 6a, and 6b depict a top, front and side views of an embodiment of a multilayer component adapted for a surface mount electrical component device;

FIG. 7 depicts a perspective view of an embodiment of a connector with a fibrillated end;

FIG. 8 depicts an end view of the multilayer component of FIG. 6 including conductive terminations;

FIG. 9 depicts a side view of an embodiment of a connector with an opening having a fibrillated interior;

FIG. 10 depicts a perspective view of an embodiment of a connector.

Embodiments are provided of various apparatus for contacts, testing, circuits, and connectors. In embodiments, the apparatus may be used in the electronic packaging industry, integrated circuits, test systems, electrical systems, circuitry and in association with systems such as, for example, printers, reproduction system, copiers, and multifunction devices, stand-alone or networked, color or black and white, analog or digital systems including xerographic, or electrophotographic apparatus.

Reference is made to embodiments of FIGS. 1–4 illustrating modular and integrated features of various connectors including conductive members including fibers.

Figure 1A:
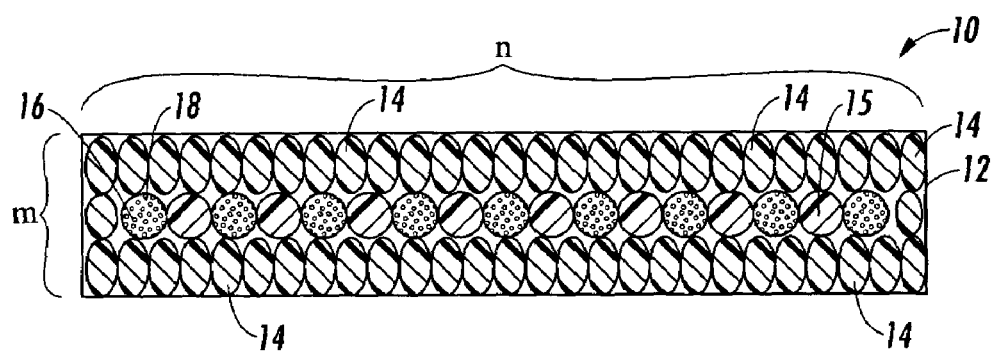

FIG. 1a depicts a top view of an embodiment of a connector 10 including a single row of conductive contacts 18 including conductive fibers 16 in a substrate member 12. Insulating members 15 are also shown in the row between contacts 18. Also, generally non-conductive spacer fibers 14 formed in a substrate member 12 are disposed about the periphery of the row of conductive contacts 18 and insulating members 15. The substrate member 12 comprises a suitable binder resin and suitable fibers forming a selected array design. Insulating members may include non-conductive monfilaments, arrays of fibers, yarns, tows, sheets containing non-conductive fibers, and the like. The array is referred to as an [m×n] array where m refers to the number of rows of conductive contacts and n defines the number of columns of conductive contacts. The connector 10 may include a selected configuration of contacts 18 in an m×n array, for example, m=1 row and n=9 columns in FIG. 1a.

Conductive contacts 18 in connectors are suitable for contact with an integrated circuit (IC) at burn-in or for use with other "temporary" or "permanent" IC sockets for a chip-socket or chip-carrier. The contacts 18 may be configured to allow removal and replacement of the bare or packaged chip in its next level electronic package.

Figure 1B:
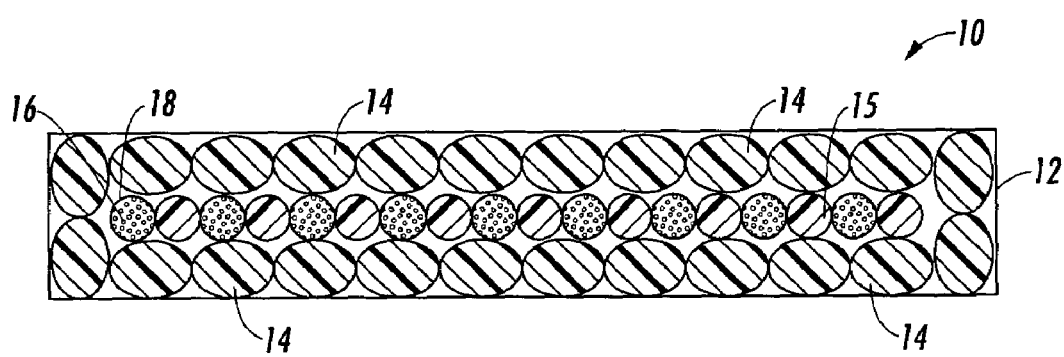

FIG. 1b illustrates a top view of an embodiment of a connector 10 including generally non-conductive fibers 14, 15 that are used to space the conductive contacts 18 in the array and provide electrical, thermal, mechanical, or other isolation or insulation amongst the conductive contacts 18.

Figure 1C:
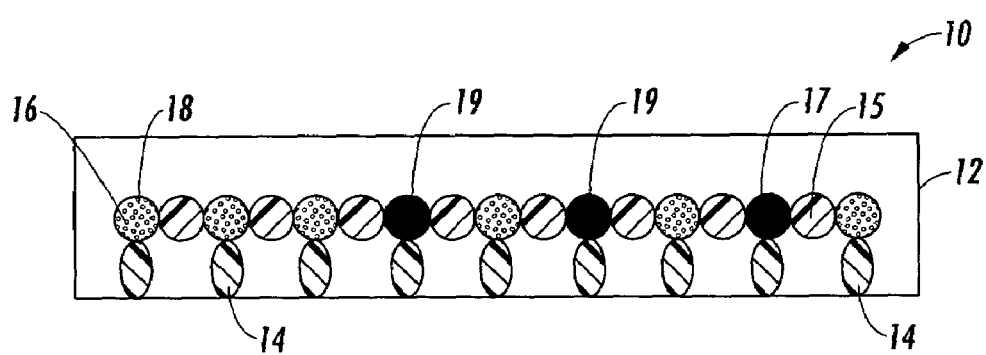

FIG. 1c illustrates a top view of an embodiment of a connector 10 including conductive contacts 18 having carbon fibers 16 and other "secondary" conductive contacts 19 which may include metal fibers or wires and other "tertiary" conductive contacts 17 which may include metallized glass or optically transmissive glass or plastic, or ceramic or other thermally conductive fiber such as pitch carbon fiber. Generally non-conductive fibers 14, 15 may be provided to space the conductive contacts 17, 18, 19 in the array.

In embodiments, the connector may be made by a pultrusion process where about 80% or greater of the cross-sectional area is fiber. Compression molding, resin transfer molding, and laminating processes may be used to form the connector.

Figure 2A:
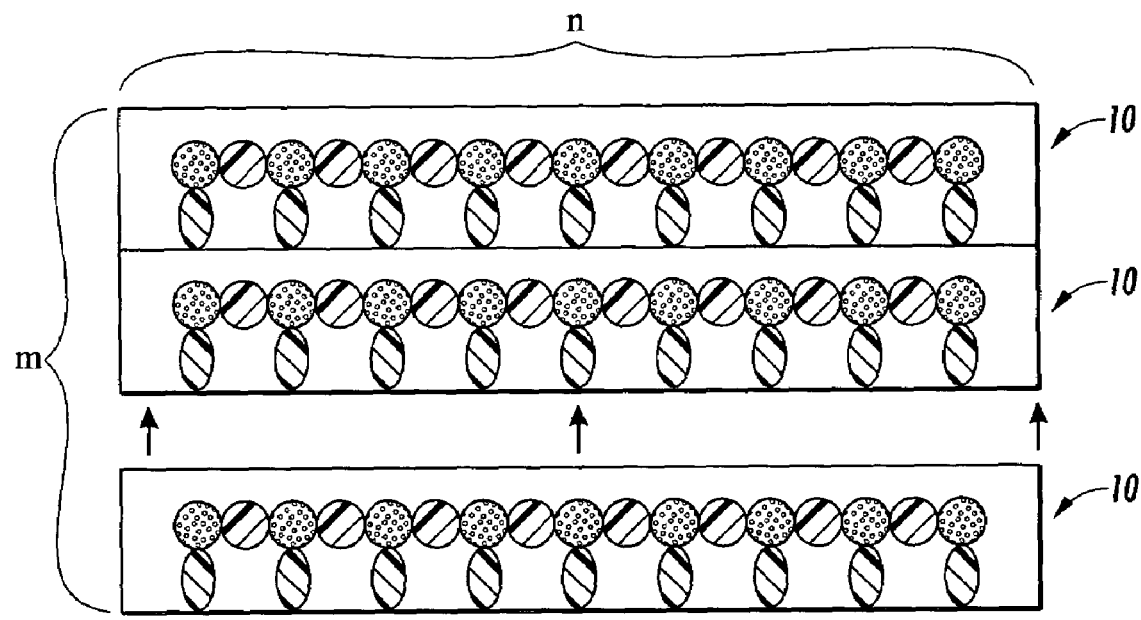
FIGS. 2a and 2b depict top views of embodiments of adjacent connector arrays configured to contain m rows of conductive regions and n columns of conductive regions.
Figure 2B:
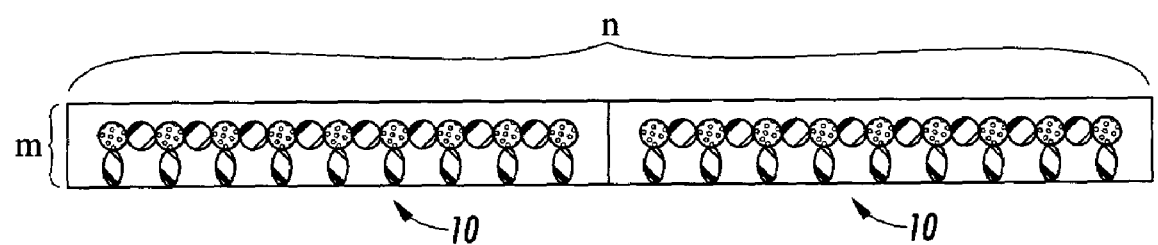

FIGS. 2a and 2b illustrate top views of embodiments of adjacent connectors 10. The connectors may be pre-configured into a (1×n) array and then be aligned into selected configurations such as a side-by-side connector system (FIG. 2a) or a length-to-length connector system (FIG. 2b), or combinations thereof resulting in a connector system having selected dimensions and contact features.

Figure 3:
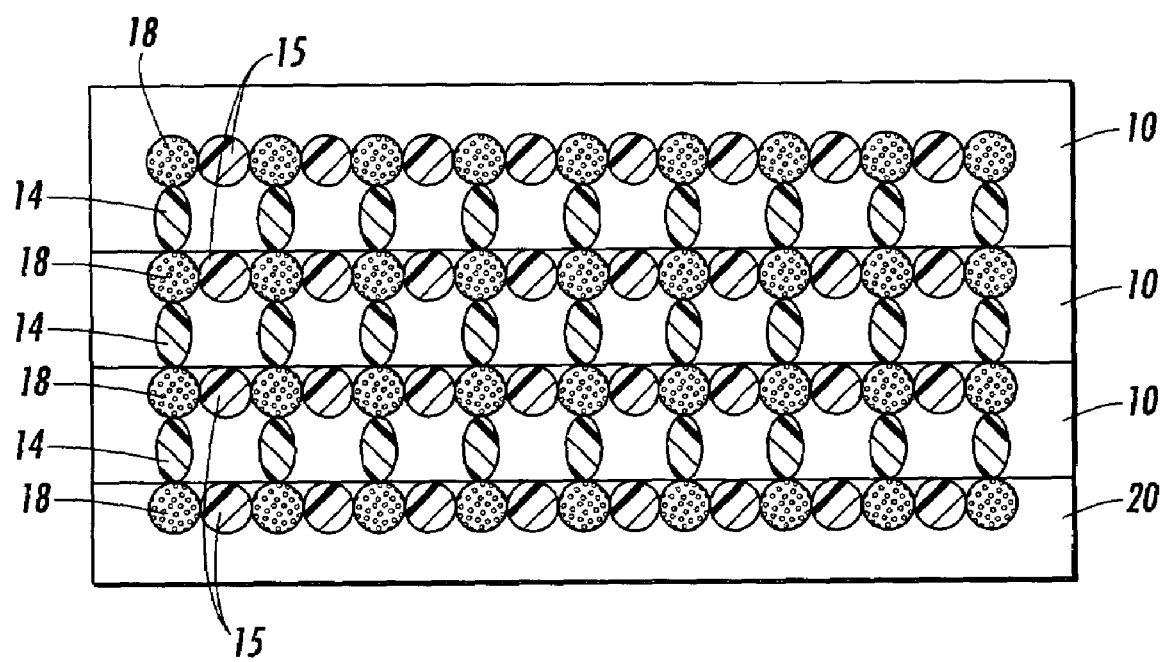
FIG. 3 depicts a top view of an embodiment of a rectangular array of modular adjacent connectors.

FIG. 3 illustrates a top view of an embodiment of an array of connectors 10, 10, 10, 20 situated in a relation to another. Connector 20 is an embodiment of a connector including one row of alternating contacts 18 and insulating members 15. Connector 20 is formed without an adjacent row of generally non-conductive spacer fibers 14. It is envisioned that an array of connectors may include one or more adjacent connector modules or members 10, 20 as well as combinations of other connectors or modules having selected features. Other connector designs including combinations of contacts 17, 18, 19, insulating members 15, and generally non-conductive spacer fibers 14 of varying dimension, position, shape, function, and features are envisioned.

Figure 4A:
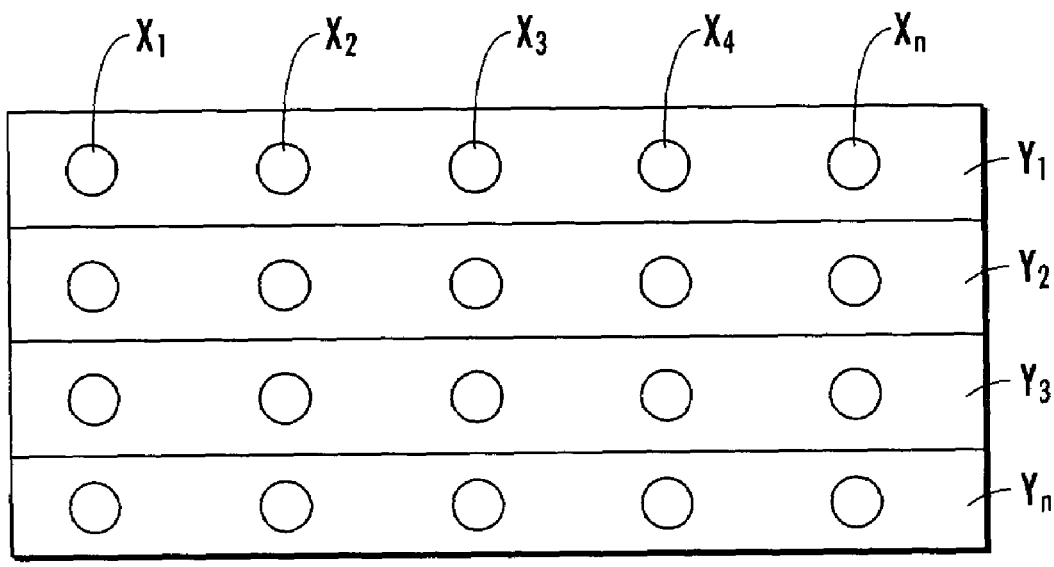
FIGS. 4a and 4b depict a top view of embodiments of an integrated rectangular array.
Figure 4B:
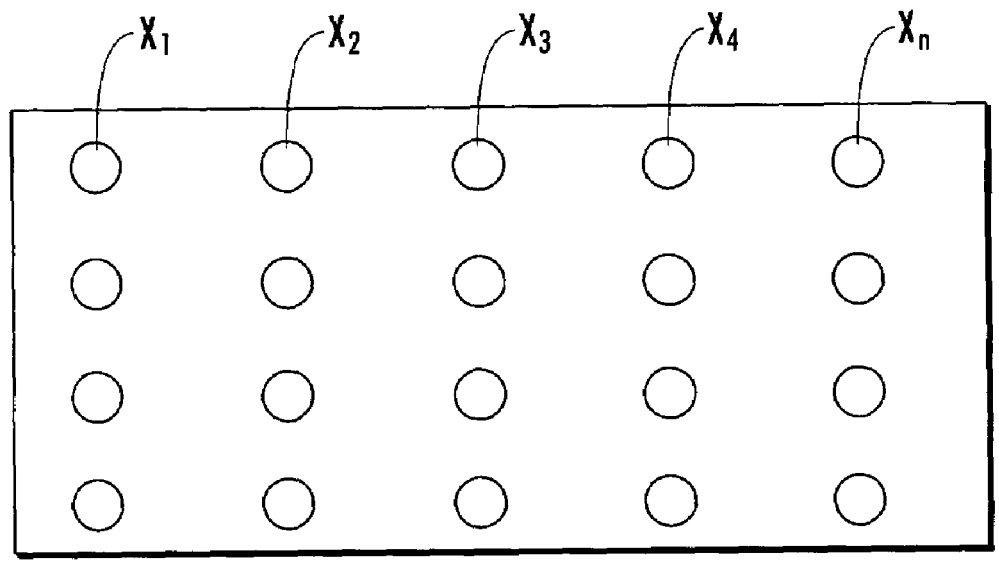

FIGS. 4a and 4b illustrate the selectability of design, position, alignment, density, and number of contacts in the connectors as well as the modularity of the array and connectors. In embodiments, an array comprising a selected number of substrate members Y in association with another is provided as shown in FIG. 4a. The substrate member(s) Y comprise a selected number of interspersed conductive members X. The substrate member(s) Y or connectors may be joined by thermal, chemical or mechanical systems or combinations thereof. The substrate member(s) Y may include distinct insulative members or it may itself be made of an insulative material. The substrate member Y may be thermally conductive and electrically insulative. In embodiments, an array of conductive members X may be formed as a fully integrated array of FIG. 4b including non-conductive spacer fiber 14 and insulating members 15 and conductive members 17, 18, 19 in selected size and matrix form.

In embodiments, the use of selectively configured distributed filament contact (DFC) elements in connectors as contacts or interconnects between the IC chip and a test circuit may increase the reliability of the individual contact sites in various applications in the electronics packaging industry and in circuitry. The DFC elements may be configured such that the conductive contacts 17, 18, 19 of the connector 10 establish contact with pads, pins, contacts, feet, or lands of the IC and the circuit board as selected.

In embodiments, the connector 10 may be configured as an integrated, separable electric interconnect device and provide a package system for an IC chip. The connector provides modularity and is generally suitable for mass manufacturing. Various shapes and sizes of the substrate member 12 and positioning and density of the conductive members 17, 18, 19 and non-conductive members 14, 15 therein are envisioned. Substrate members 12 comprising square, rectangular, triangular, round, non-circular, and irregular geometric shapes and dimensions are envisioned. The dimensions, density, spacing, and matrix configuration of the conductive members 17, 18, 19 and non-conductive members 14, 15 in the substrate 12 are selected and sized to suitably mate with contacts of an IC chip.

In embodiments, conductive fibers may be formed into their matrix configuration in a number of ways, for example: (1) the conductive fibers may be first pultruded to form a conductive pultruded composite member and then this pre-pultrusion is added to the non-conductive members to form a final pultruded matrix; (2) co-pultrude both the conductive and non-conductive fibers that are properly aligned and spaced into a final composite pultruded configuration; (3) pre-pultrude the non-conductive members into a pre-pultrusion and then combine this with the conductive fibers to create a final matrix; or (4) pre-pultrude individually both the conductive and non-conductive members and then co-pultrude these into a final matrix. In addition, other compositing techniques such as "resin transfer molding and or layer-composite laminate molding can be used instead of pultrusion.

In embodiments, a pultrusion process may be used for making a connector 10 including a selected number of integrated DFC contacts 18, secondary contacts 19 and tertiary contacts 17, and insulating members 14 and 15 within a substrate member 12 made of a suitable host polymer. Alignment and dynamic feeding of electro-conductive fibers into a pultrusion die results in an array of conductive sites, inter-spaced by insulating fibers or a substrate material. The materials comprising conductive fibers, insulating fibers, and host resin are selected to provide high density contact packing, isolation resistance between contacts for reliable mating with the chip and test circuit, and laser cutting suitability.

The fibers are fed and aligned at precise locations during the pultrusion process using guiding devices including guide plates such as thin rigid metal, wood, glass, ceramic, rubber, or plastic plates, or combinations thereof having hole patterns which correlate to the final desired array pattern and are then transformed into a rigid solid in the form of a connector.

Alternatively, a modified pultrusion process that pre-assembles the conductive elements 17, 18, 19 and/or the insulating elements 14, 15 into pultruded "pre-forms" and subsequently co-pultrudes the pre-forms into the desired array is envisioned. In embodiments, it is envisioned that a suitable thermosetting or thermoplastic resin be used for the pre-forms which is compatible with the host resin used for the final stage pultrusion. In cases where a similar thermosetting resin is employed, it may be undercured or partially cross linked during the pre-form formation process and fully cured during the final stage pultrusion process. This procedure helps to assure good adhesion between the pre-forms and other elements of the final assembly.

Figure 5:
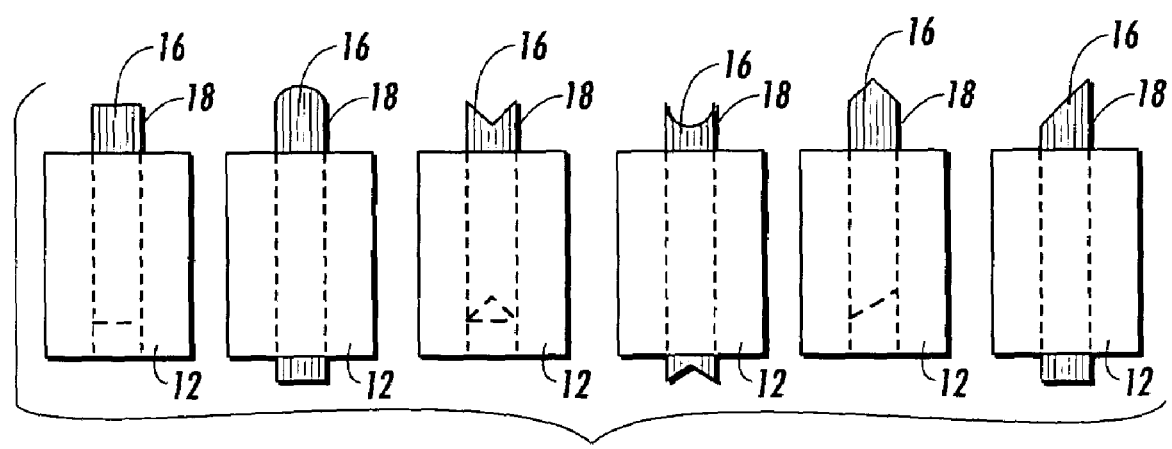
FIG. 5 depicts a side view of embodiment profiles of the contacts extending in a substrate.

Reference is made to FIG. 5 illustrating embodiments of conductive contacts such as contact 18 including profiles extending from the substrate 12, and profiles internal to the substrate 12. Combinations of the profiles internal and external to the substrate 12 are envisioned. A "heating-cutting"laser such as a $CO_2$ or CO or YAG laser, or an excimer ablation-type laser may be used for the cutting process to shape a portion of the conductive contacts 18, non-conductive members 14 and 15, or the substrate after they have solidified into the composite form in order for the contact pads on the IC chip or other device or circuit elements to mate effectively therewith. The contacts 18 may be cut or sculpted into a variety of shapes including flat, angular, convex, concave, stepped, irregular, or combination surfaces at the ends or exposed portions of selected contacts. Fibrillated fibers that are flexible may be formed on the contact at selected regions. For laser cutting, substrate material 12 and insulating member material 14, 15 are selected such that their thermal decomposition temperatures are lower than that of the conductive members 17, 18, 19. The energy of the laser is generally most effectively absorbed by material directly centered in the laser path and the material positioned in the center of the laser beam is cut. Conduction of some heat away from the cut region occurs with most materials selected for the matrix resin and insulative elements 14, 15. Thermally stable carbon or metal-carbon fibers generally tolerate laser temperatures while the less thermally stable polymers vaporize leaving behind bumps of the conductive fibers.

Alternately, other suitable surface cutting methods may be used depending upon the desired topography of the final contact surfaces. For example, water jet cutting processes can be used in those cases where a relatively flat and smooth surface is desired.

DFC fibers including carbonized polyacrylonitrile (PAN) fibers (metallized and metal plated PAN fibers) may be used as electro-conductive fibers in the conductive members 18. Generally, the conductive contact 18 may comprise bundles or "tows" of, for example, 100 or 1000 or more individual carbon or metal carbon fibers. The insulating members 14, 15 may comprise a sufficient number of fibers in yarns situated between the conductive members 18. Polyamide (nylon), polyester (PET and PBT), rayon, acrylic, non-carbonized polyacrylonitrile, fiber glass, PEEK and copolymers, blends and mixtures thereof are examples of suitable insulative non-conductive fibers. The fibers may have sizes and shapes suitably selected for the design of the final assembly. The insulating fibers may have cross sections that are round, oval, multi-lobal, flat, solid or hollow as required by the final application. The substrate member 12 may include a suitable thermal setting or thermal plastic resin which can be processed in the pultrusion process. The substrate member may also be made of the same material as the insulating members 14. Materials used in the system may also include polymeric fibers, glass, quartz, preoxidized PAN, partially carbonized PAN, optical fibers, metal fibers, metal alloy fibers and combinations thereof.

Reference is made to FIG. 6 illustrating an embodiment of a multilayer component assembly 100 including a surface mount electronic component device 120, such as an integrated circuit, associated with a base substrate 125 using surface mount technology (SMT). The base substrate 125 may include conductive materials including carbon fiber containing CarbonConx (CCX) utilized as a substrate material as well as an interconnect medium. The assembly 100 may include conductive members 110 including fibers and insulating members 112 including fibers. Embedded conductive fibers are co-pultruded with non-conductive host material forming an N×M configuration, for example, n=4, m=1. End surfaces of the base substrate 125 may be processed with a laser to expose and allow fiber areas 111 to extend from the body of the substrate to facilitate connection to external circuitry. Electrical power and signal pins 113 may be used as surface mount interconnects for connecting the device 120 to the base substrate 125. This configuration allows replacement of an assembly. One or more channels 121 or breaks in the conductive members may be formed in the base substrate to isolate signals as desired in the circuitry. FIG. 6a illustrates a front view of the multilayer component of FIG. 6. FIG. 6b illustrates an end view of the multilayer component of FIG. 6 including conductive terminations such as fibrillated ends 111.

In embodiments, connector system 100 provides miniaturization and integration of embedded CCX electrical features. Electronic components may be mounted to the CCX materials for point of load interfacing and terminations. A selected mating structure in the assembly 100 may be used to make the electrical interconnections to conventional wiring or PWB-type circuit boards, for example. A variety of connector configurations are envisioned. The cross-section of the assembly 100 may be most any shape. More than one system may be mounted together including planar (for example, two-dimensional "2-D") and non-planar (for example three-dimensional "3-D" configurations using conventional FR4 type 2-D and 3-D circuit boards as a mounting surface, for example.

In connector embodiments, CCX materials in conductive members 110 may be included in single or multi-layer configurations in the assembly 100. Selected surface and substrate preparation provides integration of electronic components such as surface mount devices and a multi-layer connector system. Embedded layer(s) with resistive properties may be used to eliminate the necessity for discrete resistive components on the surface of the substrate. Applications of thermoplastic carbon fiber composites along with thermosetting materials are envisioned.

In connector embodiments, portions of the conductive composite pultruded members 110 may be mechanically or spatially separated from the surrounding non-conductive members 112 and thereby may serve as a mechanical spring member at the point of electric contact with the device 120. This provides for an effective, reliable, and independent-acting electro-mechanical interconnect at every position on the device. A selected matrix configuration may include a conductive fiber region separated spatially and electrically from another conductive fiber region. The conductive member may be accessible along at least a portion of its length to provide a conductive surface area for contact with the circuit.

Generally soft, springy CCX contacts may be used for applications with moving objects and for point of load electronics for control or signal acquisition with the integration of the assembly components on the same substrate member. In embodiments, the connector systems provide a generally high level of integration with a robust, high temperature material, with a minimum of interconnection components and may be applied to various electronic assembly applications including circuitry such as micro-electronic devices, microprocessors, digital signal processing, embedded sensors, wireless communications, telecommunications, medical devices and medical probes.

In connector embodiments, carbon fiber composites may be used either as the primary or secondary substrate. Electronic components may be fabricated on a PWB type material and then be affixed to the surface of a secondary composite substrate that may optionally be part of the electrical circuit. A $CO_2$, YAG, or excimer laser may be used for the formation of contact wells or pockets in the body of a composite material. The internal walls of the pocket may include fibrillated regions that may be either used for interference fit electrical contacts or for through-hole connections.

To make the interconnection between device 120 and selected sockets permanent, the electronic device 120 may be mounted to the connector utilizing conductive adhesives, for example conductive epoxies or solder, or in combination with auxiliary substrates augmented by PWB systems. The materials may be selectively constructed and formed to provide alternating conductive and non-conductive areas or circuited areas. The integration of the soft contacts at an assembly level provides generally cost effective and reliable electronic systems.

Reference is made to FIG. 7 illustrating an embodiment of an Radio Frequency (RF) type connector 300. In such an RF connector, high frequency RF current generally flows in a thin skin layer adjacent to the surface where the contact is made and direct current or low frequency alternating current generally flows through a greater cross-section of the conducting material. The connector 300 may include a carbon-containing body 210, metal layers 220, internal conductive members 240, or fibrillated fibers 240 extending at selected areas from an end or surface. The fibrillated fibers 240 may provide compliant redundant contacts. FIG. 8 illustrates an end view of an embodiment of a connector 200 with a solid core. FIG. 9 depicts a side view of a connector with an opening 230 that may include fibrillated fibers 240 for contact with an associated member. FIG. 10 illustrates an embodiment of an angled or elbow shaped connector 250. In embodiments, the connectors may be formed in selected shapes and include a variety of angles and features.

In embodiments, an RF connector may include carbon fiber and composite plastic configured into a suitable contact geometry. The contact member may be a solid rod or hollow tube having a major outer diameter ranging from about 0.3 mm to 100 mm, over coated or partially coated with a suitable metal layer, having a thickness ranging from about 0.001 microns to 25 microns. The connector may be in the form of a tube with an additional metal layer on the inside surface, outside surface, or combination thereof. The connector may have a solid core. The RF connector may be used in RF contact applications to improve the efficiency and reliability of RF devices. The metal layer may be used to provide at least one, high electric conductivity pathway between a component, for example a chip or a test circuit. The connector may include fibers at its end(s) that are fibrillated to locally remove the binder polymer or surrounding non-conductive member. A metal layer may be applied to encase the fiber tips. The current carried in an RF, high frequency contact is generally transported within the surface layer of the connector such as the outermost layer of approximately 1-to-25 microns thick that carries the current. Depths greater than about 25 microns from the surface layer (outside or inside surfaces) generally do not participate in the current carrying function of an RF device. In general, the higher the frequency, the narrower the current carrying layer that is required. Therefore, thin metal layers on the carbon fibers may be used to carry RF current in a contacting pair of contact elements, for example, connectors, interconnects, and related components.

In embodiments, a pultrusion process may be used to make an integrated array of fiber-rich contacts contained within a solid structure where each fiber contained within the individual contact region is a metallized-carbon fiber. The regions separating the contact regions are designed to be electrically insulating and may contain suitable non-conductive fibers or other suitable spacer members, for example plastic films or tapes, polymeric foams or fiber-based fabrics, and the like. The contact regions within the structure are designed to align on one surface with, for example, the contact pads of an IC chip and with the contact pads of a circuit board on the opposing side. The metallized fibers provide a compliant and low force, reliable, multiple-redundant, low resistance, current path between the device and circuit.

In embodiments, a thin metal layer ranging in thickness from about 0.01 to about 1.5 micron is coated over 6 to 10 micron diameter carbon fibers. The carbon fibers may be a high strength Thornel™ T-300 fiber, a high modulus Thornel™ T-650 fiber, or a low modulus partially carbonized Thornel™ T-150 fiber. Thornel is a tradename of Union Carbide Corp. Many carbon fibers are commercially available from carbon fiber producers such as Cytec Carbon Fibers, Inc. The metal layer can be applied by vacuum, vapor, vapor-phase deposition, electroplated, or electroless plated, or a combination of these methods. The metal layer can consist of a single layer or can comprise two or more layers. The metal layer may include various metals or metal alloys. For example, nickel, copper, gold, platinum, tungsten, silver, palladium, tin, iron, aluminum, zinc, chromium, lead, or alloys such as brass, nickel/boron, gold/carbon, palladium/nickel, silver/carbon, and the like, and combinations thereof may be used. The metal layer can consist of a eutectic metal alloy such as tin/lead or similar solder. The conductive fibers may be coated or partially coated with a electrically conductive material, thermally conductive material, and combinations thereof. Metal layers may be applied to the fibers by suppliers such as INCO Special Products of Wyckoff, N.J. and West Glam, Wales.

In embodiments, T-300 type carbon fibers may be packaged at 1,000 filaments per tow and unsized. Vapor deposition of nickel metal to a thickness of ½ to 1 micron corresponding to about 1% to 90% of the weight of the carbon may be applied to the carbon fibers. The metal coating may have a weight in the range of from about 2% to 50% of the weight of the carbon in the pultruded composite conductive member. The nickel metallized carbon may be pultruded in a selected resin binder to form a generally circular 300 micron diameter solid rod shape. The cross-sectional area of a set of bundled fibers may range from about 0.01 square microns to 1000 square microns. A selected number of rods (such as ten rods) may be co-pultruded into a flat 1×10 array of conductive rods separated by insulating resin or by resin and insulating fiber to form a rectangular array with 0.33 mm to 0.50 mm center-to-center spacings. The array may be cut with a suitable $CO_2$ laser to fibrillate the metal-carbon fibers from the binder resin forming an array of resin-free, metal-fiber rich contact regions. One or more of the arrays may be used as an interconnect to contact a device, such as an IC chip along one surface and a circuit board, for example, along the other. The metal may be applied to the carbon-fiber rods or to the individual fibers contained within the rods for a generally low resistance contact. Another option is to also metallize not only the fibers but the external surface of the rods. A further option is to metallize the carbon fiber only at the contact tip regions after laser cutting.

In an embodiment, a thin layer of gold may be vapor deposited onto all of the exposed surfaces of a CCX component such as a slip ring connector including carbon fibers in MODAR® epoxy modified acrylic resin, available from Ashland Composite Plastics, Dublin, Ohio. The component may be placed in a vacuum-sputtering chamber such as EffaCoater No. 18930, commercially available from Ernest F. Fullam, Inc., Latham, N.Y. After a 50 second argon purge, the chamber may be evacuated to a level less than 100 mTorr. Power (50 mA) may be applied to sputter the gold onto the component. A layer of gold may cover the entire component including the individual fibrillated fibers. The gold layer may be continuous and well adhered to the component. The surface conductivity of the component may be increased by about 20× with the addition of the gold coating.

In embodiments, various materials can be configured for use with high frequency (RF) contacts, connectors, connector bodies, and the like. In embodiments, a carbon fiber containing a pultruded rod, for example, 6 mm diameter may be used to carry RF energy. A metal coating of the fibers and/or the structure generally improves its efficiency. A rod or tube shaped structural member may be used for an RF contact or connector including metallized carbon fibers pultruded in a suitable binder resin, such as MODAR® modified acrylic. A laser may be used to fibrillate fibers and to drill-form holes into the rod or tube or elbow to mate with other conventional contacting devices such as metal pin connectors. Alternately, the rod or tube or elbow shaped member can be selectively metallized on the internal surfaces, external surfaces or both. For large, tubular shapes that are used as connector bodies in RF connectors, for example, resin transfer molding and or layer-composite laminate molding can be used instead of pultrusion. Internal or external surface features (such as ring grooves, recesses, wells, slots, threads, and the like) may be incorporated into the structure without the need for secondary machining operation and without interruption of the skin-layer conduction mechanisms.

In embodiments, conductive pultruded composite member may extend from the substrate at a first side and from the substrate at a second side for a selected distance and are adapted for contact; the conductive pultruded composite members and the non-conductive members may be disposed in more than one plane and be situated offset from each other; the apparatus may be used for establishing a permanent electrical circuit with at least one other element such as a circuit, integrated circuit, component or assembly; the apparatus may be used for establishing a temporary electrical circuit; the apparatus may be used for testing of a separable circuit; the apparatus may be used for testing of a removeably securable circuit in association therewith; a circuit may be securable to at least a portion of the apparatus; the plurality of conductive pultruded composite members and the plurality of non-conductive members may each include a longitudinal axis situated in the substrate substantially parallel to one another; at least one conductive pultruded composite member may include a first surface area and a second surface area exposed for conduction of energy therethrough; the energy may be selected from at least one of electric, thermal, sound, sonic, and light energy; the at least one conductive pultruded composite member may include a fibrillated portion having a length in the range from 0.001 mm to 100 mm; the at least one conductive pultruded composite member may include a first end and a second end and at least a portion of the first end and the second end are fibrillated and for establishing a circuit that is permanent; at least one conductive pultruded composite members may be accessible along its length to provide a conductive surface area for contact; each of the conductive fibers may have a thickness in the range from 0.001 microns to 1 millimeter; a conductive fiber region area as a percent of the substrate member area may range from 0.5% to 99.5%; at least one additional substrate member may include a plurality of conductive pultruded composite members including a plurality of conductive carbon fibers having a length and a plurality of non-conductive members having a length including at least one of a non-conductive fiber and a non-conductive resin; and a pultruded conductive composite member may have a length and a diameter in the range of from 1 micron to 2 meters. The conductive pultruded composite members and the non-conductive members form a selected matrix configuration. The substrate members are adapted for adjacent association and form an array of selected dimension dependent on the number of substrate members; the selected matrix configuration may include a non-conductive region separated from another non-conductive region; the selected matrix configuration may include a conductive fiber region situated adjacent a non-conductive fiber region; the substrate member may include a polymer; an average distance between the center of the conductive fiber regions may range from 1.001 to 10,000 times greater than the area of the largest conductive fiber region; an average distance between the conductive fiber regions may range from 0.0011 microns to 1 meter; the surface area measured on an outside perimeter of the substrate member may range from 0.01 square millimeters to 10 square meters; the carbon fibers may include at least one of carbonized polyacrylonitrile fibers, carbonized pitch fibers, carbonized polybenzimidazole (PBI) fibers, metalized carbon fibers, and combinations thereof; each fiber may be generally circular in cross section and have a diameter range of from 0.5 micrometers to 25 micrometers; the fibers may have a DC volume resistivity of from $1\times10^{-5}$ ohm-cm to $1\times10^{+15}$ ohm-cm, the substrate member may include at least 0.001% by weight conductive fibers; the apparatus may be used for voltages ranging between $1\times10^{-12}$ volts and $10^{+6}$ volts and currents ranging between $10^{-9}$ amps and $10^{+6}$ amps and at least one of direct current or frequencies up to 100 gigahertz; the apparatus may be suitable for use in an RF electric circuit to conduct alternate current in the range of 1 hertz to 100 giga-hertz; the member may include from 1 to $1\times10^{+7}$ point contacts per cm$^2$; the polymer may be selected from at least one of structural thermoplastic, thermosetting resin, and crosslinked silicone elastomer; the resin may be selected from at least one of a polyester, vinyl ester, polyethersulphone, polyetheretherketone, polyetherimide, polyimide, polyamide, polyacrylic, epoxy-modified acrylic, phenolic, epoxy, copolymers, and combinations thereof; the apparatus may include a plurality of substrate members associated with one another such that the conductive and non-conductive pultruded members extend in substantially the same direction; an end of at least one of the conductive pultruded composite members may include a flexible or spring-like fibrillated region exposed on the apparatus; an end of at least one of the conductive pultruded composite members may includes a hard, non-fibrillated region; the fibrillated region may include a plurality of conductive fibers; an end of at least one of the conductive pultruded composite members may include a shaped profile selected from at least one of rectangular, square, stepped, concave dome, convex recess, concave point, angular, and irregular; and combinations thereof; the apparatus may includes a plurality of non-conductive members comprising non-conductive fibers; the conductive members and the non-conductive members may be pultruded composite members; the conductive contact area may be adapted to associate with an electronic component or an integrated circuit to provide continuity from the at least one conductive member on one side of the recess, across the at least one recess, and to the at least one conductive member on the other side of the recess; the conductive fibers may be carbon fibers, metallized carbon fibers, metallized glass fibers, metallized polymeric fibers, carbon particle containing polymeric fibers, metal particle containing polymeric fibers, intrinsically conducting polymeric fibers, fine metal wires, or combinations thereof; the conductive contact area may be adapted to associate mechanically as well as electrically with an electronic component to provide an electromechanical contact; and the non-conductive area may be adapted to associate mechanically with an electronic component to provide a mechanical contact structure.

In embodiments, the apparatus or conductive member may not be straight along its length and may extend in more than one direction. The member may include a lumen. The lumen including an opening to permit the passage of light or air. The member may include an opening or bore in a tube. The member may be a rod or a tube. The member may include a cavity. The member may include an opening in a wall between the interior and exterior periphery surfaces. The conductive region may be for communication with a circuit. The conductive region may be exposed at a periphery surface. A plurality of conductive fibers may be at least partially coated with an electrically conductive material. The conductive region may be at least partially coated with an electrically conductive material. The conductive members may include a thermally conductive material. The coating layer may be formed by at least one of vacuum deposition, vapor deposition, electroplated, sputter coating, and electroless plated process. The conductive material may be a metal or metal alloy. The conductive material may include at least one of nickel, copper, gold, platinum, tungsten, silver, palladium, tin, iron, aluminum, zinc, chromium, lead, brass, nickel/boron, gold/carbon, palladium/nickel, and silver carbon. The metal may be an eutectic metal alloy including tin/lead and solder. The conductive fibers are carbon and the metal coating may have a weight in the range of from 2% to 50% of the weight of the carbon pultruded conductive composite member. The conductive region may be within 25 microns of at least one of the exterior periphery surface and the interior periphery surface. The metal coating may have a weight in the range of from 1% to 90% of the weight of the pultruded conductive composite member. The plurality of carbon fibers may be metal coated and pultruded in a resin binder to form a cross-sectional shape that comprises a metal coating wherein the coating has a weight in the range of from 1% to 90% of the weight of the pultruded conductive composite member. The plurality of carbon fibers may be metal coated and separated from another by at least one of a resin binder and insulating fiber. A plurality of conductive fibers may be bundled together forming at least one set of conductive fibers, the at least one set of conductive fibers having a length and cross sectional area in the range of from less than 0.01 square microns to 1000 square microns wherein a metal coating having a thickness is disposed on at least a portion of an outside surface of the at least one set of conductive fibers. Fibrillated fibers may extend from a surface. The fibrillated region may have a length in the range from 0.001 mm to 100 mm and be substantially flexible. The fibrillated region may include an exposed plurality of conductive fibers extending from the member. The apparatus may be suitable for use in an RF electric circuit to conduct current in the range of 1 hertz to 100 giga-hertz.

It is appreciated that various other alternatives, modifications, variations, improvements, equivalents or substantial equivalents of the teachings herein that for example, are or may be presently unforeseen, unappreciated or subsequently arrived at by applicants or others are also intended to be encompassed by the claims and amendments thereto.

What is claimed:

1. An apparatus comprising:
a substrate member including a length, a width, a thickness, and a surface area, the substrate member including a polymer, a plurality of conductive members and a plurality of non-conductive members, each of the conductive members and the non-conductive members have a length and an imaginary axis; wherein the plurality of conductive members comprises a plurality of conductive fibers and a polymer material, the plurality of conductive fibers configured in a relation to each other and in association with the polymer material; wherein the plurality of conductive members and the plurality of non-conductive members are disposed in the substrate member and are situated with respect to each other and form a matrix configuration including at least one dimension between the imaginary axis of the plurality of conductive members and including at least one dimension between the imaginary axis of the plurality of non-conductive members; wherein at least one non-conductive member is situated between at least two conductive members; wherein the conductive members and the non-conductive members are in a non-woven relation in the substrate member; wherein the polymer of the substrate member is solidified about at least a portion of a periphery of the plurality of conductive members and is solidified about at least a portion of a periphery of the plurality of non-conductive members forming an integral structure; and wherein at least one conductive member includes an exposed surface for contact.

2. The apparatus of claim 1, wherein at least one of the conductive members and the non-conductive members are pultruded composite members.

3. The apparatus of claim 1, wherein at least one conductive member extends from the substrate at a first side and from the substrate at a second side for a distance.

4. The apparatus of claim 1, wherein the exposed surface includes fibers unbound and substantially free of polymer.

5. The apparatus of claim 1 wherein the plurality of conductive members and the plurality of non-conductive members are disposed in more than one plane.

6. The apparatus of claim 1 wherein the apparatus is adapted for association with at least one element and an electrical circuit.

7. The apparatus of claim 1 wherein the apparatus is adapted for association with at least one element and a temporary electrical circuit wherein the at least one element is removeably securable to the apparatus.

8. The apparatus of claim 1 further comprising an integrated circuit wherein the integrated circuit is securable to at least a portion of the apparatus.

9. The apparatus of claim 1 further comprising a die wafer containing individual integrated circuit chips wherein the die wafer is securable to at least a portion of the apparatus.

10. The apparatus of claim 1, wherein at least one conductive member includes a first surface area and a second surface area exposed for conduction of energy therethrough wherein the energy is selected from at least one of electric, thermal, sound, sonic, and light energy.

11. The apparatus of claim 1, wherein the imaginary axis of at least one of the conductive members and the non-conductive members includes a form selected from substantially straight, angled, and curved.

12. The apparatus of claim 1, wherein at least one conductive member includes a plurality of conductive carbon fibers.

13. The apparatus of claim 1, wherein at least one conductive member is accessible along at least a portion of its length to provide a conductive surface area for contact.

14. The apparatus of claim 1 wherein an area of the conductive member as a percent of an area of the substrate member ranges from 0.01% to 99.5%.

15. The apparatus of claim 1 further comprising at least one additional substrate member, the at least one additional substrate member including: (a) a plurality of conductive members comprising a plurality of conductive fibers, the conductive members having a length; and (b) a plurality of non-conductive members comprising at least one of a non-conductive fiber and a non-conductive resin, the non-conductive members having a length, the conductive members and the non-conductive members forming a matrix configuration; wherein the at least one additional substrate member is adapted for functional association with the other substrate member and defining an array of substrate members including a configuration dependent on the selected number of substrate members.

16. The apparatus of claim 1 wherein the substrate member comprises a polymer selected from at least one of structural thermoplastic, thermosetting resin, and crosslinked silicone elastomer.

17. The apparatus of claim 1 wherein the fibers include carbon including at least one of carbonized polyacrylonitrile fibers, carbonized pitch fibers, carbonized polybenzimidazoles (PBI) fibers, metalized carbon fibers, and combinations thereof.

18. The apparatus of claim 1 wherein the fibers include at least one of metal, metal alloy, glass, metalized glass, metalized ceramic, metalized polymer, optically transmissive polymer, and combinations thereof.

19. The apparatus of claim 15 wherein the army of substrate members is adapted to be assembled into a configuration by heat lamination, adhesive bonding, ultrasonic or other welding process, by mechanical fastening or interlocking, or combinations thereof.

20. An apparatus comprising:
a substrate member comprising a polymer, the substrate member including: a length; a width; and a thickness;
a plurality of conductive pultruded composite members including a plurality of conductive carbon fibers and a polymer material, the plurality of conductive carbon fibers configured in a relation to each other and in association with the polymer material, each conductive pultruded composite member having a first end and a second end; and
a plurality of non-conductive members including a plurality of non-conductive fibers, each non-conductive member having a first end and a second end;

wherein the plurality of conductive pultruded composite members and the plurality of non-conductive members are disposed in the substrate member and are situated with respect to each other and form a matrix configuration including at least one dimension between the imaginary axis of a plurality of conductive pultruded composite members and including at least one dimension between the imaginary axis of a plurality of non-conductive members; wherein at least one non-conductive member is disposed between at least one pair of conductive members defining a spatial relation between the plurality of conductive members and the plurality of non-conductive members in the matrix configuration; wherein the conductive members and the non-conductive members are in a non-woven relation in the substrate member wherein the polymer of the substrate member is solidified about at least a portion of a periphery of the plurality of conductive pultruded composite members and is solidified about at least a portion of a periphery of the plurality of non-conductive members forming an integral structure; and wherein at least one conductive pultruded composite member is accessible at the first end and the second end for contact.

21. The apparatus of claim 20, wherein at least one of the conductive pultruded composite members includes a flexible fibrillated region.

22. The apparatus of claim 20 wherein at least one of the conductive pultruded composite members includes a hard, non-fibrillated region.

23. The apparatus of claim 20 wherein at least one of the conductive pultruded composite members includes a shaped profile, the shaped profile selected from at least one of rectangular, square, stepped, concave dome, convex dome, concave point, convex recess, angular, and irregular.

24. The apparatus of claim 20 wherein the substrate member includes a recessed area.

25. The apparatus of claim 20 wherein the substrate member includes a plurality of conductive pultruded composite members extending in a plurality of longitudinal directions in more than one plane.

26. An apparatus comprising:
a substrate member comprising a polymer, the substrate member having a length, width, and thickness;
a plurality of conductive members having a first end, second end, and length, the plurality of conductive members comprising a plurality of conductive fibers extending in the substrate member;
at least one continuity break defining an interruption along the length of at least one conductive member between the first end and the second end of the at least one conductive member, wherein the at least one continuity break is defined by a recess formed in the substrate member and absence of at least a portion of the at least one conductive member;
at least one conductive contact area is associated with at least one conductive member on one side of the at least one continuity break, and at least one conductive contact area is associated with at least one conductive member on the other side of the at least one continuity break;
wherein the plurality of conductive members are disposed in the substrate member and are situated with respect to each other and form a matrix configuration including at least one dimension between the imaginary axis of a plurality of conductive members; wherein the polymer of the substrate member is solidified about at least a portion of a periphery of the plurality of conductive members forming an integral structure.

27. The apparatus of claim 26, wherein the at least one recess includes a width, depth, and extends in the substrate member.

28. The apparatus of claim 26, wherein the apparatus further includes a plurality of non-conductive members comprising non-conductive fibers.

29. The apparatus of claim 28, wherein at least one of the conductive members and the non-conductive members are pultruded composite members.

30. The apparatus of claim 26, wherein the at least one conductive contact area is adapted to associate with at least one of an integrated circuit and an electronic component to provide continuity from the at least one conductive member on one side of the at least one continuity break, across the at least one continuity break, and to the at least one conductive member on the other side of the at least one continuity break.

31. The apparatus of claim 26, wherein an end of at least one conductive member extends from the substrate.

32. The apparatus of claim 26, wherein the plurality of conductive members includes exposed fibrillated fibers.

33. The apparatus of claim 26, wherein the plurality of conductive composite members include conductive fibers comprising at least one of carbon fibers, metallized carbon fibers, metallized glass fibers, metallized polymeric fibers, carbon particle containing polymeric fibers, metal particle containing polymeric fibers, intrinsically conducting polymeric fibers, fine metal wires, and combinations thereof.

34. The apparatus of claim 26, wherein the substrate member comprises at least one conductive member including a first surface area on one side of the at least one continuity break and a second surface area on the other side of the of the at least one continuity break exposed for conduction of energy therethrough wherein the energy is selected from at least one of electric, thermal, sound, sonic, and light energy.

35. The apparatus of claim 26, wherein the at least one conductive contact area is adapted to associate mechanically and electrically with an electronic component to provide an electro-mechanical contact.

36. The apparatus of claim 26, wherein at least one non-conductive area is adapted to associate mechanically with an electronic component to provide a mechanical contact structure.

* * * * *